(12) United States Patent
Zhou (10) Patent No.: US 6,212,724 B1
(45) Date of Patent: Apr. 10, 2001

(54) PASSENGER BOARDING BRIDGE FOR NARROW BODY AIRCRAFT

(76) Inventor: Yuanda Zhou, Haiwan Rd., Shekou Industry District, Shenzhen, Guangdong, 518057 (CN)

( * ) Notice: Subject to any disclaimer, the term of this patent is extended or adjusted under 35 U.S.C. 154(b) by 0 days.

(21) Appl. No.: 09/340,072

(22) Filed: Jun. 25, 1999

(30) Foreign Application Priority Data

Jun. 30, 1998 (CN) .............................. 98 2 35996

(51) Int. Cl.$^7$ ................................................. C01D 1/00
(52) U.S. Cl. .............................. 14/71.5; 14/69.5
(58) Field of Search ................... 14/69.5, 71.1, 14/71.5, 72.5

(56) References Cited

U.S. PATENT DOCUMENTS 3,060,471 * 10/1962 Der Yuen et al. .
5,761,757 * 6/1998 Mitchell et al. ...................... 14/71.5

* cited by examiner

Primary Examiner—Eileen D. Lillis
Assistant Examiner—Gary S. Hartmann
(74) Attorney, Agent, or Firm—Raymond Y. Chan; David & Raymond (57) ABSTRACT

A passenger boarding bridge for narrow body aircraft that does not require a bubble section. On the right hand half of the cab floor lengthwise there are two openings, and connected to the floor at each opening there is an up-folding hinged floor board. On the back side of floor there are gas springs that are used to flip up the hinged boards and also a cylinder that can move an extension board forward and backward at the front end of floor. At the bottom of the floor there are electrical locks for locking the hinged floor boards when they are in the horizontal position. On the back side of the floor there is also a cylinder to drive the safety cylinder at the front end of the floor in a lateral direction. Above the first piece of the frame of the canopy two extra short are added, the bottom part of which is split but connected with a hinge. The front part of the frame is covered with foam rubber. Attached to the canopy frame is a gas spring to open up the frame into a multisided shape. An actuator actuates the opening and closing of the canopy. This boarding bridge is not only suitable for use with large and medium sized aircraft but is at the same time suitable for small aircraft.

10 Claims, 9 Drawing Sheets

PASSENGER BOARDING BRIDGE FOR NARROW BODY AIRCRAFT

BACKGROUND OF THE PRESENT INVENTION

1. Field of Invention

This invention relates to a type of aircraft passenger boarding bridge which, besides being suitable for large and medium size airplanes, is particularly suitable as a boarding bridge for narrow body aircraft fitted with their own stairs.

2. Description of Related Arts

The boarding bridge in present day use that are employed for passengers embarking and disembarking from an airplane are made of five parts including a rotunda, telescopic tunnel, bubble section, cab, and elevating columns with wheel carriage. Their structure is large and cumbersome, and in particular the structure of the floor and canopy of the cab is not suitable for small aircraft such as the SAAB340, ATR72 and F100 which have their own stairs. Because of the small size of these aircraft, when connecting with the boarding bridges that are commonly only suited for large and medium sized planes there will usually be a gap between the boarding bridge and the airplane that has to be crossed by a manually positioned gangplank for the passengers to get on or off the airplane. This is neither convenient nor safe. At the same time, since the cab and the airplane are not close fitting, this dose not meet the requirements of fire hazard prevention. Because of their size the large boarding bridges also have the disadvantage of being clumsy and expensive to transport around.

SUMMARY OF THE PRESENT INVENTION

The object of the present invention is to overcome the many disadvantages of the above mentioned boarding bridges, and to provide a light weight passenger boarding bridge that does not require a bubble section and is suited for use not only with ordinary large and medium sized aircraft but is especially suited for small aircraft that carry their own stairs like the SAAB340, ATR72 and F100 type airplanes. Moreover, it is light and ingenious in structure, safe, and convenient and cheap to transport.

The embodiment of the present invention is as follows.

The present invention for the passenger boarding bridge for narrow body aircraft consists of a rotunda, a telescopic tunnel, a cab and elevating columns with wheel carriage. The telescopic tunnel consists of an inner telescoping tunnel and an outer tunnel. The inner telescoping tunnel can extend into and out of the outer tunnel. One end of the telescoping tunnel connects to the rotunda, and its special characteristic is that its other end connects to the cab. This cab is characterized by its special structure: on the right hand half of the cab floor lengthwise there are two openings which divide the floor into two parts, floor P and floor Q, and connected to the floor at each opening there is an up-folding hinged floor board. On the back side of floor P there are gas springs that are used to flip up the hinged boards and also a cylinder that can move an extension board forward and backward at the front end of floor P. On the right hand side of floor Q and at the bottom of the inner side of the right hand floor opening there are electrical locks for locking the hinged floor boards when they are in the horizontal position. On the back side of floor Q there is also a cylinder for pushing sideways the bumper at the front end of floor Q.

The first piece of the frame of the canopy on the cab has two short plates, the bottom part of which is split but connected with a hinge. The front part of the frame is covered with foam rubber. The top of the canopy frame has attached a gas spring to open up the frame and allow it to assume a multisided shape. A steel cable and pulley assembly used to close up the canopy is fixed on the two sides of the cab. The actuator that drives the opening and closing of the canopy is fixed at the top of the cab.

At the right of the cab above the hinged floor board there is a small handrail fixed to the canopy frame for the convenience of passengers when they enter or exit the airplane. Above the small handrail a control panel is mounted on a shaft on the canopy frame so it can rotate around the shaft. Wire glass is installed on the left and right sides of the cab.

The cab is connected to a rotating frame through a roller system on its base and nylon sliding pads on the upper part of its rear sides. A cylinder mounted on the base beam drives the cab so that it can move sideways in the transverse direction on the rotating frame.

The rotating frame is connected to the telescopic tunnel by means of two large pin shafts on the left frame of the tunnel and two sliding pads at the top and bottom of the right hand side. Driven by a cylinder at its base the rotating frame can rotate around the pin shaft 80° to the left and 15° to the right. The fan-shaped roof on top of the rotating frame and the fan-shaped floor platform at the bottom are both made of rolled channel steel; during rotation the channel steel slides along the sliding pads.

For tight sealing and safety there are pleated screens between the rotating frame and cab bridge head as well as on both sides of the bridge head. The folding screen walls between the rotating frame and telescopic tunnel are made of glass panels.

The telescopic tunnel consists of tunnels A, B and C. Tunnel A is the extension section and is connected to the rotunda at one end and fixed at the other end to Tunnel B with bolts. Tunnel C which connects with the cab can slide along its length inside tunnel B along sliding pads which are mounted at the four corners of the tunnel. A motor mounted at the bottom of the tunnel drives Tunnel C so it can be extended or retracted when pulled by a chain installed also at the bottom.

All four sides of the telescopic tunnel are of truss structure 1. The two sides are fitted with laminated glass. On the bottom part of the truss structure of the tunnel is an N-shaped duct for housing the electric cables and oil pipes between Tunnel B and C. At the cab end of the central Tunnel B there is a braking device so that in case the chain breaks and Tunnel C starts to slide forward it will be stopped inside Tunnel B. A ramp is installed between Tunnel C and the cab. At one side of the interconnection between Tunnel B and A there is a baggage door, below which is a service staircase and a baggage conveyor belt alongside the staircase for transporting baggage. A case for holding electrical components is mounted opposite the baggage door.

At the top of the column supporting the rotunda there is a large swivel bearing. Below this bearing a supporting frame is welded to the column to support a fixed frame. The shape of the fixed frame is similar to that of the air terminal boarding gate, to which it connects. The large swivel bearing directly supports the horizontal rotating frame which is integrated with its base plate. The roof and base plates of the rotating frame are positioned horizontally on the top and bottom of the tunnel connection structure. A roller blinds structure is installed on the two sides of the fixed frame. The top of the tunnel is connected to the roof plate of the rotating frame, while its bottom has a pin shaft hole, through which the pin shaft connects the rotunda with Tunnel A. Between tunnel A and the rotunda there is a cover for sealing and protection against wind, rain and snow.

Elevating columns with wheel carriage: The wheel carriage assembly includes a driving wheel bogie and slave wheel bogie which support the entire elevating columns with wheel carriage and are fitted with the driving wheel and slave wheel, respectively. The oil tank connects the two wheels. The driving wheel is driven by a motor which is mounted on the bogie. The angle between the planes of the driving wheel and slave wheel is 174° so that the wheels can rotate around the center of the rotunda along a circular curve (the radius of which varies as the length of the bridges). Within a 180° arc of rotation the system can rock sideways. An electric motor, oil pump, valve station, electricity box and oil pipes are installed on the oil tank. Rising vertically from the two bogies are the elevating columns each of which includes an inner column and an outer column. The inner columns are bolted to the wheel carriage assembly, while the outer columns are connected to the horizontal cross beam underneath. Nylon slider pads are inserted between the inner and outer columns. Tunnel B is connected to the horizontal cross beam by pin shaft fixtures, and rotates about the shaft when it is raised or lowered. The elevating cylinder is connected by its upper mount to the horizontal cross beam. The lower cylinder mount is connected to the oil tank. Tunnel B is connected to the oil tank by jointed connecting rods. When the elevating columns with wheel carriage are in operation rising or descending, there will be some longitudinal movement between the elevating columns and Tunnel B, so in this invention a spring or cylinder assembly is installed at the top of Tunnel B on both sides of the columns to maintain balance. To prevent lateral rocking of the elevating columns with wheel carriage when rotating, this invention has also installed sliding pads between the columns and tunnel to keep the tunnel in place. To keep the wheels and the elevating columns always in their correct position this invention has also incorporated a special self-correcting system.

Compared with present boarding bridges in use this invention has the following advantages.

The passenger boarding bridge embodied in this invention for narrow body aircraft does not required a bubble section, and moreover includes corresponding modifications to the cab, canopy and tunnels, thus it is suited for use not only with ordinary large and medium sized aircraft but is especially suited for small aircraft that carry their won stairs like the SAAB340, ATR72 and F100 type airplanes. Moreover, it is light and ingenious in structure, safe, and convenient and cheap to transport.

DETAILED DESCRIPTION OF THE PREFERRED EMBODIMENT

From the figures it can be seen that this invention embodies a passenger boarding bridge for narrow body aircraft which consists of a rotunda III, a telescopic tunnel II, a cab I and elevating columns with wheel carriage IV. The telescopic tunnel II consists of an inner telescoping tunnel and an outer tunnel. The inner telescoping tunnel can extend into and out of the outer tunnel. One end of the telescoping tunnel II connects to the rotunda, and its special characteristic is that its other end connects to the cab I. This cab I is characterized by its special structure: on the right hand half of the cab floor lengthwise there are two openings which divide the floor into two parts, floor P and floor Q, and connected to the floor at each opening there is an up-folding hinged floor board 103. On the back side of floor P there are gas springs 105 that are used to flip up the hinged boards and also a cylinder 108 that can move an extension board 104 forward and backward at the front end of floor P. On the right hand side of floor Q and at the bottom of the inner side of the right hand floor opening there are electrical locks 106 for locking the hinged floor boards 103 when they are in the horizontal position. On the back side of floor Q there is also a cylinder 102 for pushing sideways the bumper 101 at the front end of floor Q.

Figure 1:
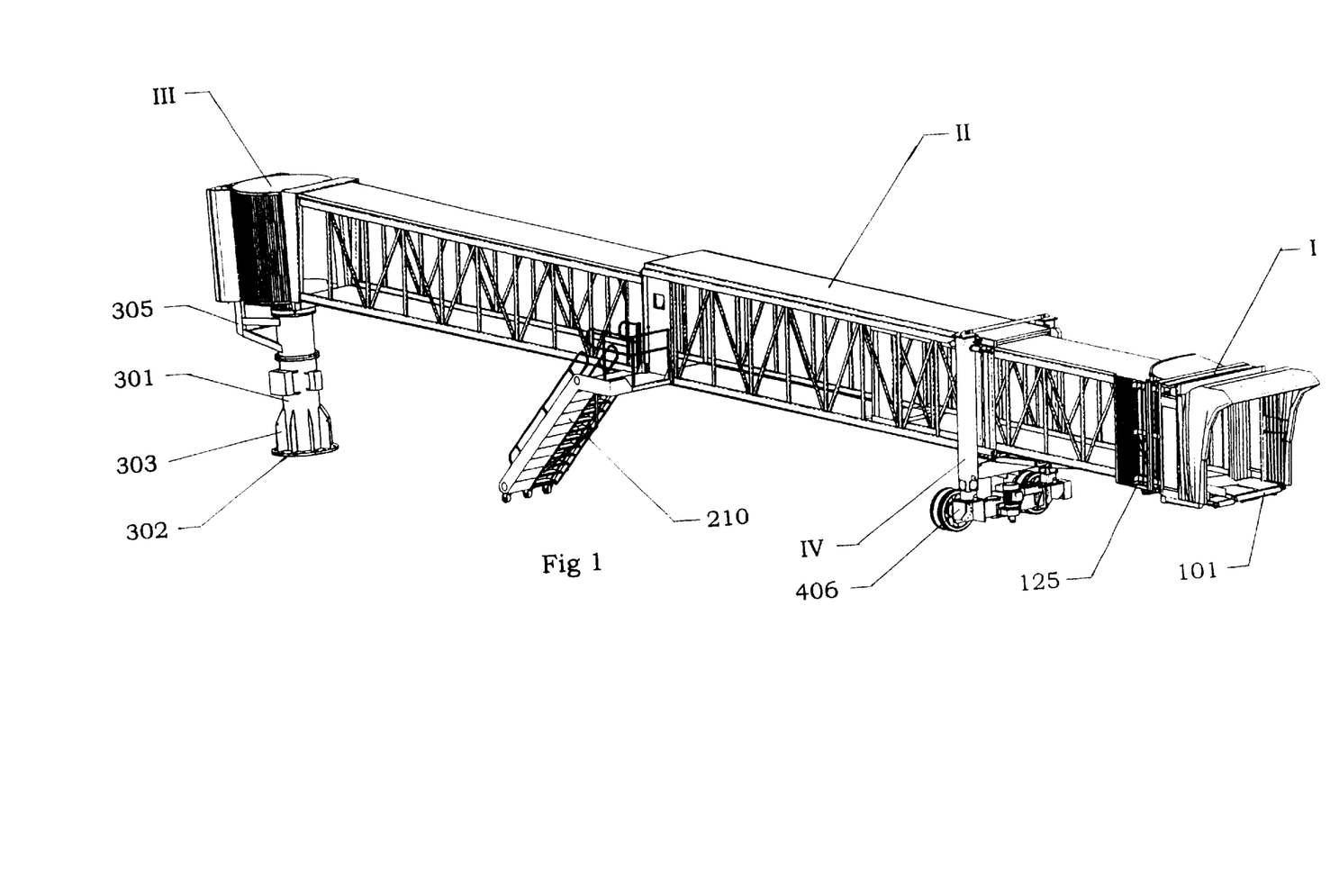
FIG. 1 is one example of the perspective view of passenger boarding bridge for narrow body aircraft according to a preferred embodiment of the present invention, illustrating the general structure of the present invention.
Figure 2:
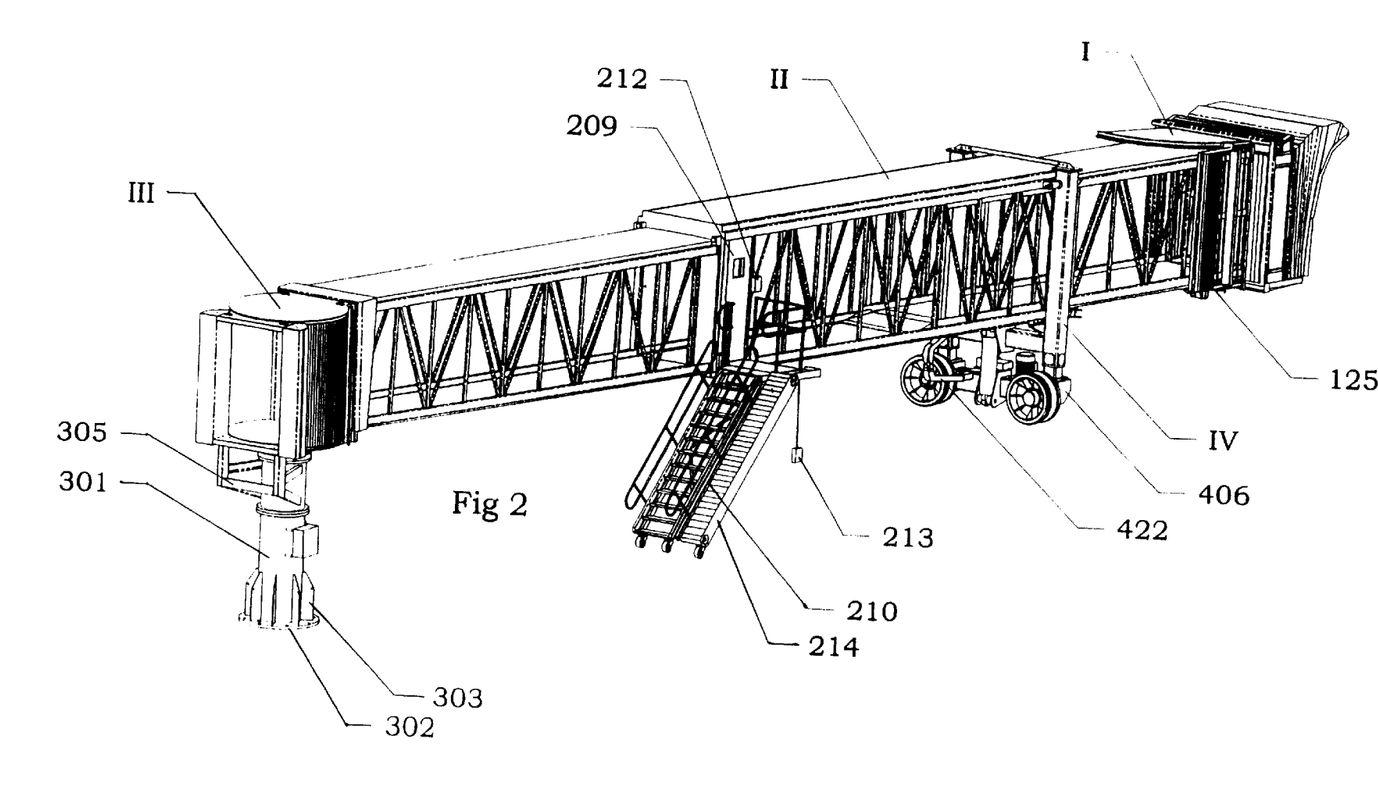
FIG. 2 is another example of the perspective view of passenger boarding bridge for narrow body aircraft according to a preferred embodiment of the present invention, illustrating the general structure of the present invention.
Figure 3:
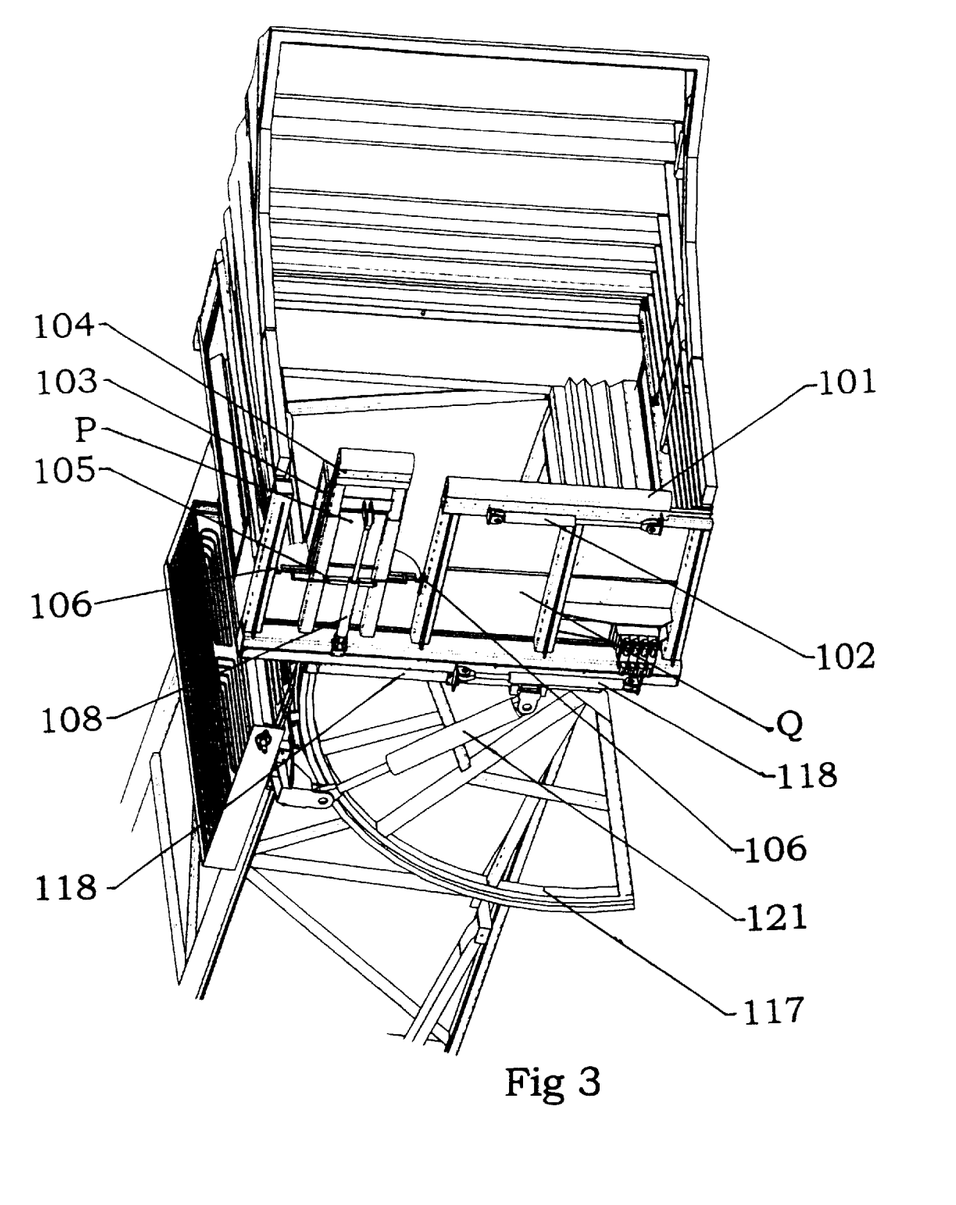
FIG. 3 is one example of the perspective view of passenger boarding bridge for narrow body aircraft according to the above preferred embodiment of the present invention, illustrating the structure of the cab.
Figure 4:
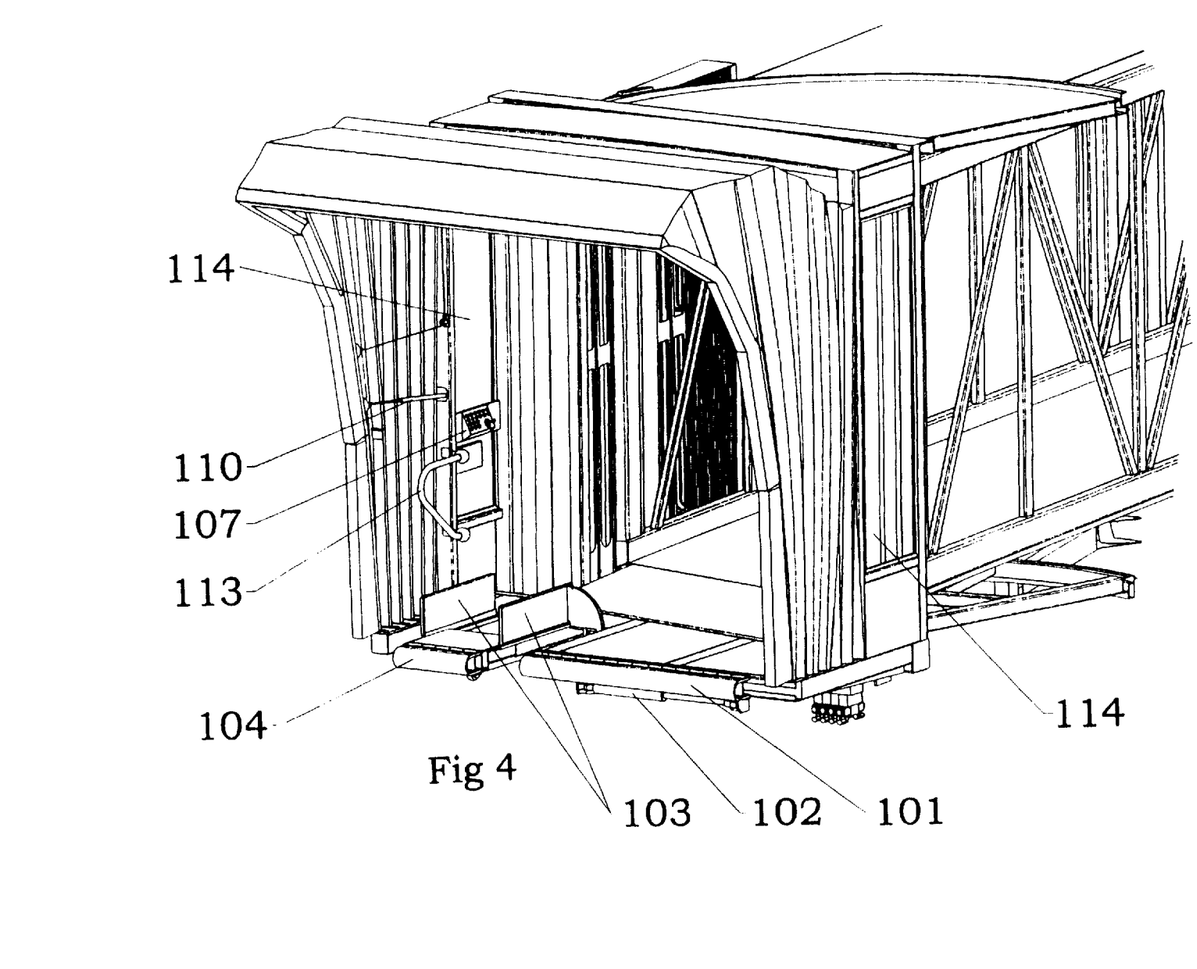
FIG. 4 is another example of the perspective view of passenger boarding bridge for narrow body aircraft according to the above preferred embodiment of the present invention, illustrating the structure of the cab.
Figure 5:
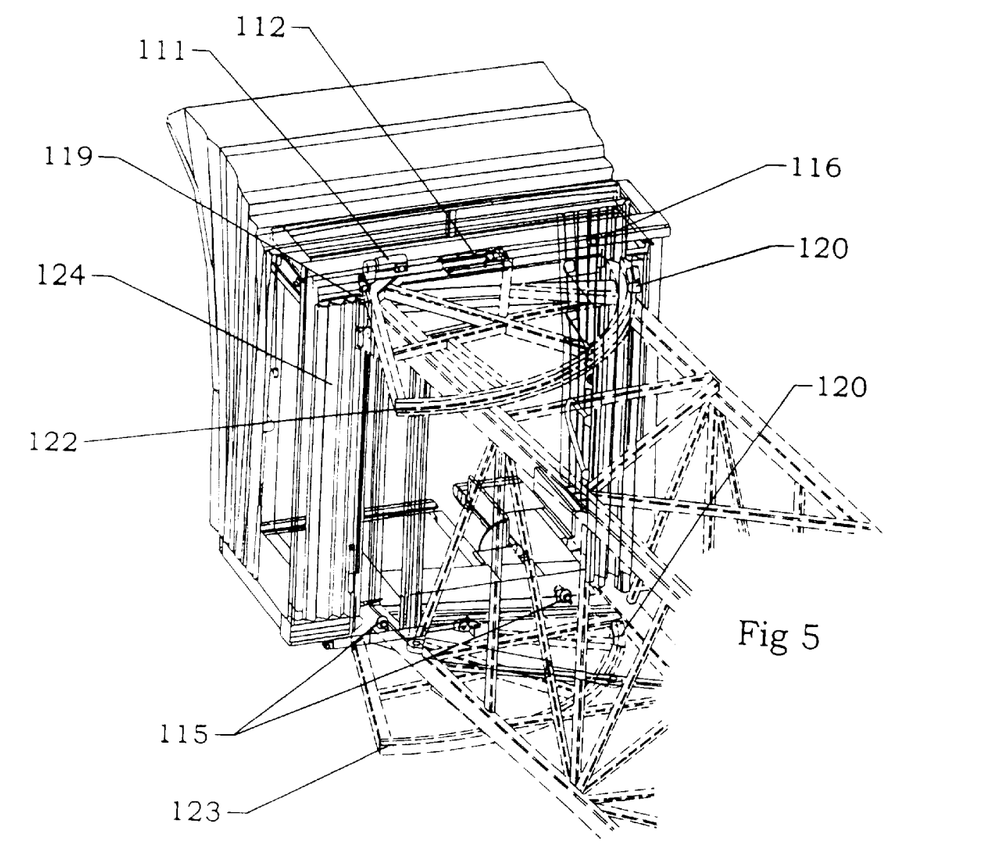
FIG. 5 is another example of the perspective view of passenger boarding bridge for narrow body aircraft according to the above preferred embodiment of the present invention, illustrating the structure of the cab.

When the narrow body aircraft passenger boarding bridge embodied in this invention is being connected to small airplanes like the SAAB340, the gas spring 102 pushes the safety cylinder 101 at the front of the floor Q to the left, so that the two openings for the up-folding boards are disclosed. If the airplane staircase has handrails on both sides, then the gas springs 105 will push the folding boards 103 upwards to be perpendicular to floor P and to serve as kick boards for the extension board 104. If the airplane only has one handrail, then it is only necessary to raise one folding board 103, step on the other folding board 103 so that it becomes level, and use the electric lock 106 to lock it in place. The control panel 107 has buttons for controlling the folding boards 103 and it is very convenient to operate. When the passenger bridge approaches the airplane, the opening of the folding board 103 is aligned with the handrail of the small plane which is then approached gradually so that everything fits snug close up to the airplane. The extension board 104 at the front end of floor P can be driven forwards and backwards by the cylinder 108, so that its distance from the airplane can be adjusted.

The first piece of the flame of the canopy 109 on the cab I has two short plates; the bottom plate is split 900 mm down then connected with a hinge. The front part of the frame is covered with foam rubber. The top of the canopy frame has attached gas springs 110 to open up the frame and allow it to assume a multisided shape. Under the force of the gas springs, the frame will become multisided and on deformation of the foam rubber the canopy will press close to the airplane body. A steel cable and pulley assembly used to close up the canopy is fixed on the two sides of the cab. The actuator 111 that drives the opening and closing of the canopy is fixed at the top of the cab. Under the action of the balancing device 112 the steel cable can automatically adjust the position of the two sides of the canopy to meet the requirements of small aircraft.

At the right of the cab above the hinged floor board 103 there is a small handrail 113 fixed to the canopy frame for the convenience of the passengers when they enter or exit the airplane. A control panel 107 which can rotate around a shaft is mounted above the small handrail. The control buttons are on the control panel 107. Wire glass is fitted on the left and right sides of the cab so that the operator has fair visibility for convenience of operation.

The cab I is connected to a rotating frame 117 through a roller system 15 on its base and nylon sliding pads 116 on the upper part of its rear sides. A cylinder 118 mounted on the base beam drives the cab I so that it can move sideways in the transverse direction on the rotating frame 117. Before coupling with the airplane, the cab I is first moved to the left, when it is close to the airplane it is moved to the right. The cab I is maneuvered to fit up with the airplane door and staircase handrail 1 while watching the wing and propellers of the airplane through the glass window. Care must be taken not to touch the propellers on the wing.

The rotating frame 117 is connected to the telescopic tunnel II by means of two large pin shafts 119 on the left frame of the tunnel and two sliding pads 120 at the top and bottom of the right hand side. Driven by a cylinder 121 at its base the rotating frame 117 can rotate around the pin shaft 80° to the left and 15° to the right. The fan-shaped roof 122 on top of the rotating frame and the fan-shaped floor platform 123 at the bottom are both made of rolled channel steel; the sliding pads are in the center of the channel steel girders 117. During rotation the channel steel slides along the sliding pads.

Between the rotating frame 117 and cab I as well as on both their side walls there are pleated screens 124 for tight sealing and safety. The folding screen walls 125 between the rotating frame 117 and telescopic tunnel are made of glass panels for good transparency and visibility.

Figure 6:
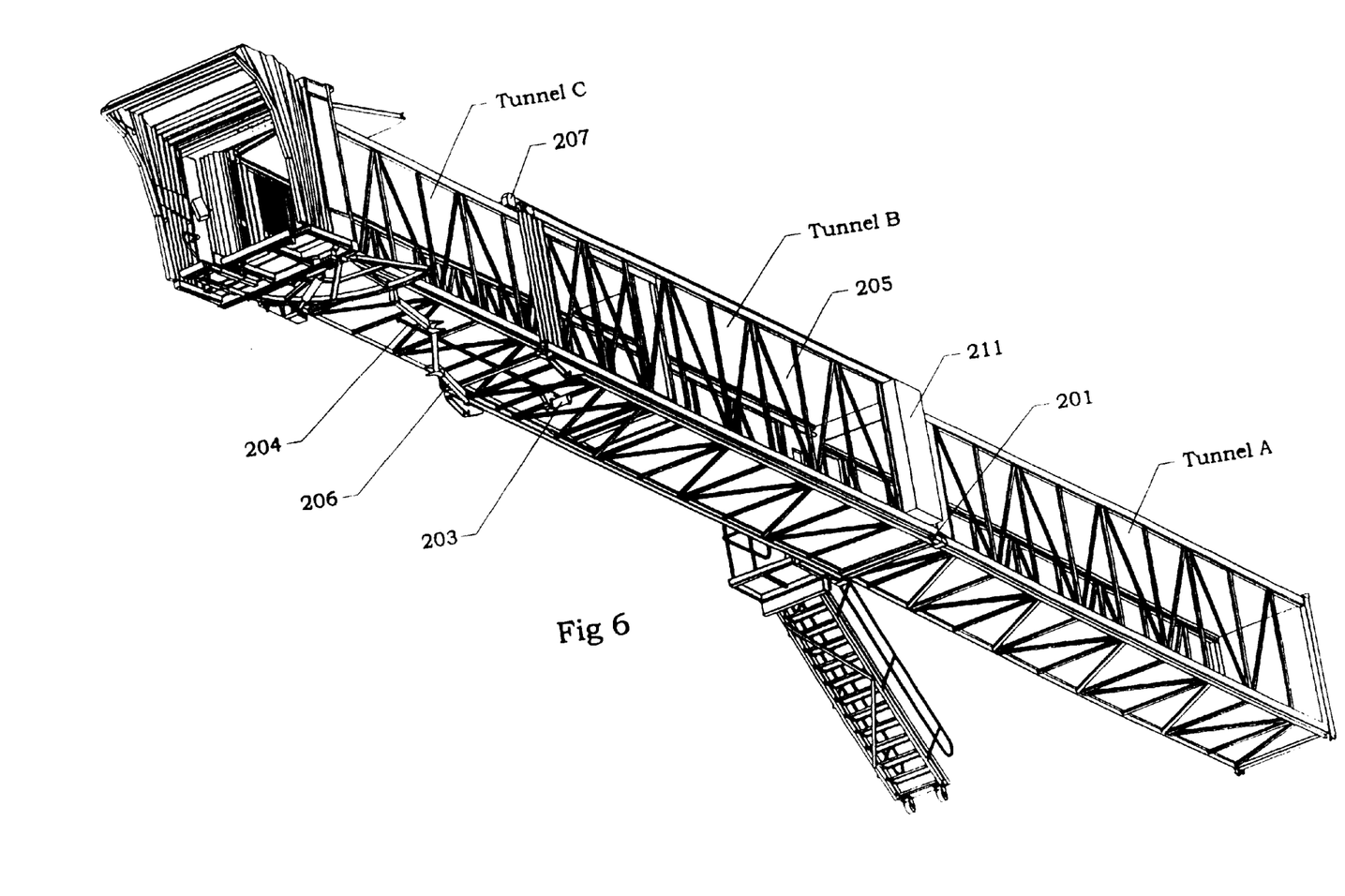
FIG. 6 is one example of the perspective view of passenger boarding bridge for narrow body aircraft according to the above preferred embodiment of the present invention, illustrating the structure of the telescopic tunnel.
Figure 7:
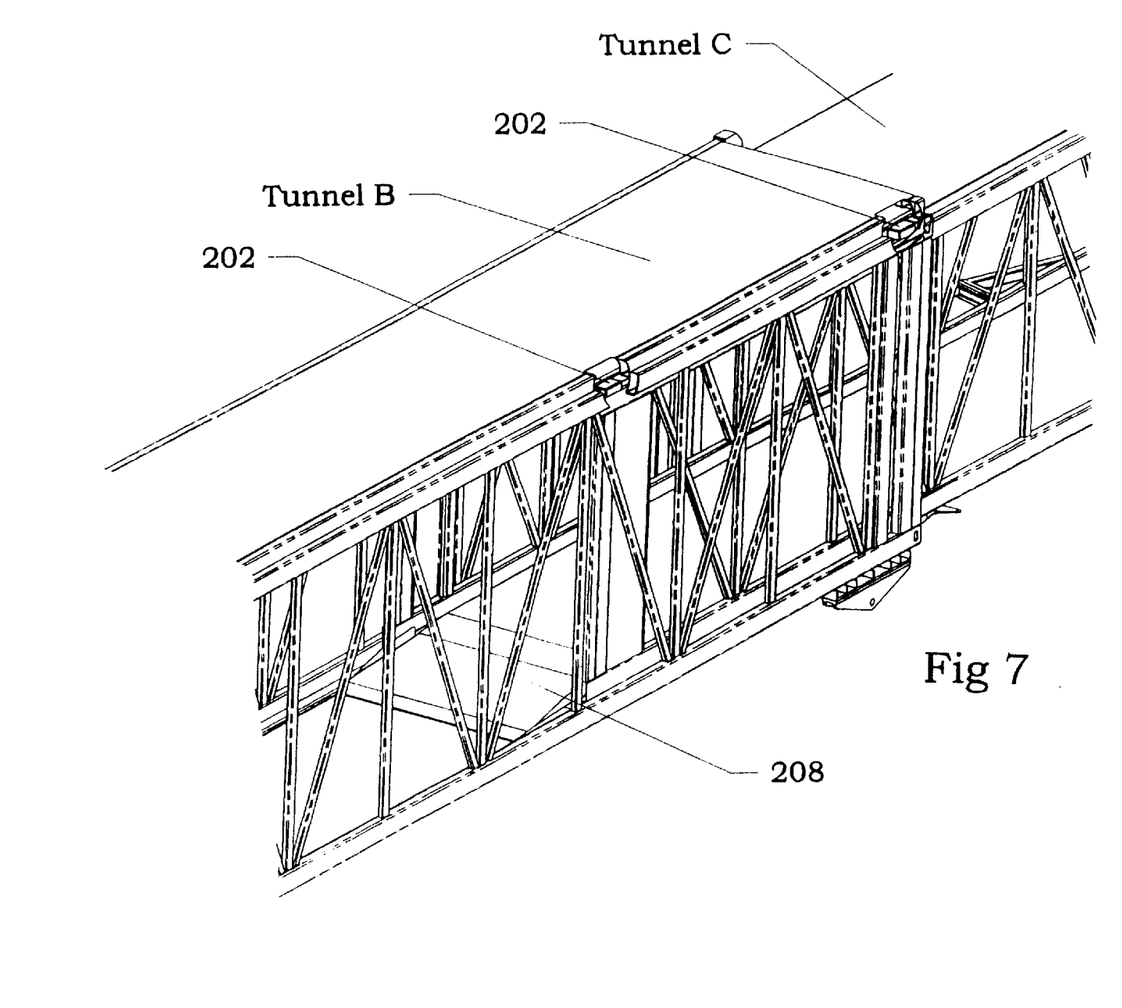
FIG. 7 is another example of the perspective view of passenger boarding bridge for narrow body aircraft according to the above preferred embodiment of the present invention, illustrating the structure of the telescopic tunnel.

The telescopic tunnel consists of tunnels A, B and C. Tunnel A is the extension section and is connected to the rotunda III at one end and fixed at the other end to Tunnel B with bolts 201. Tunnel C which connects with the cab I can slide along its length inside tunnel B along sliding pads 202 which are mounted at the four comers of the tunnel. A motor 203 mounted at the bottom of the tunnel drives Tunnel C so it can slide within Tunnel B when pulled by a chain 204 installed also at the bottom.

All four sides of the telescopic tunnel II are of truss structure. The two sides are fitted with laminated glass. On the bottom part of the truss structure of the tunnel II is an N-shaped duct 206 for housing the electric cables and oil pipes between Tunnel B and C. At the cab I end of the central Tunnel B there is a braking device. A ramp 208 is installed between Tunnel C and the cab I. At one side of the interconnection between Tunnel B and A there is a baggage door 209, below which is a service staircase 210 and a baggage conveyor belt 214 alongside the staircase for loading baggage into the airplane baggage compartment. There is a control switch box 212 beside the baggage door and another one 213 below the staircase landing. A case 211 for holding electrical components is mounted opposite the baggage door 209.

Figure 8:
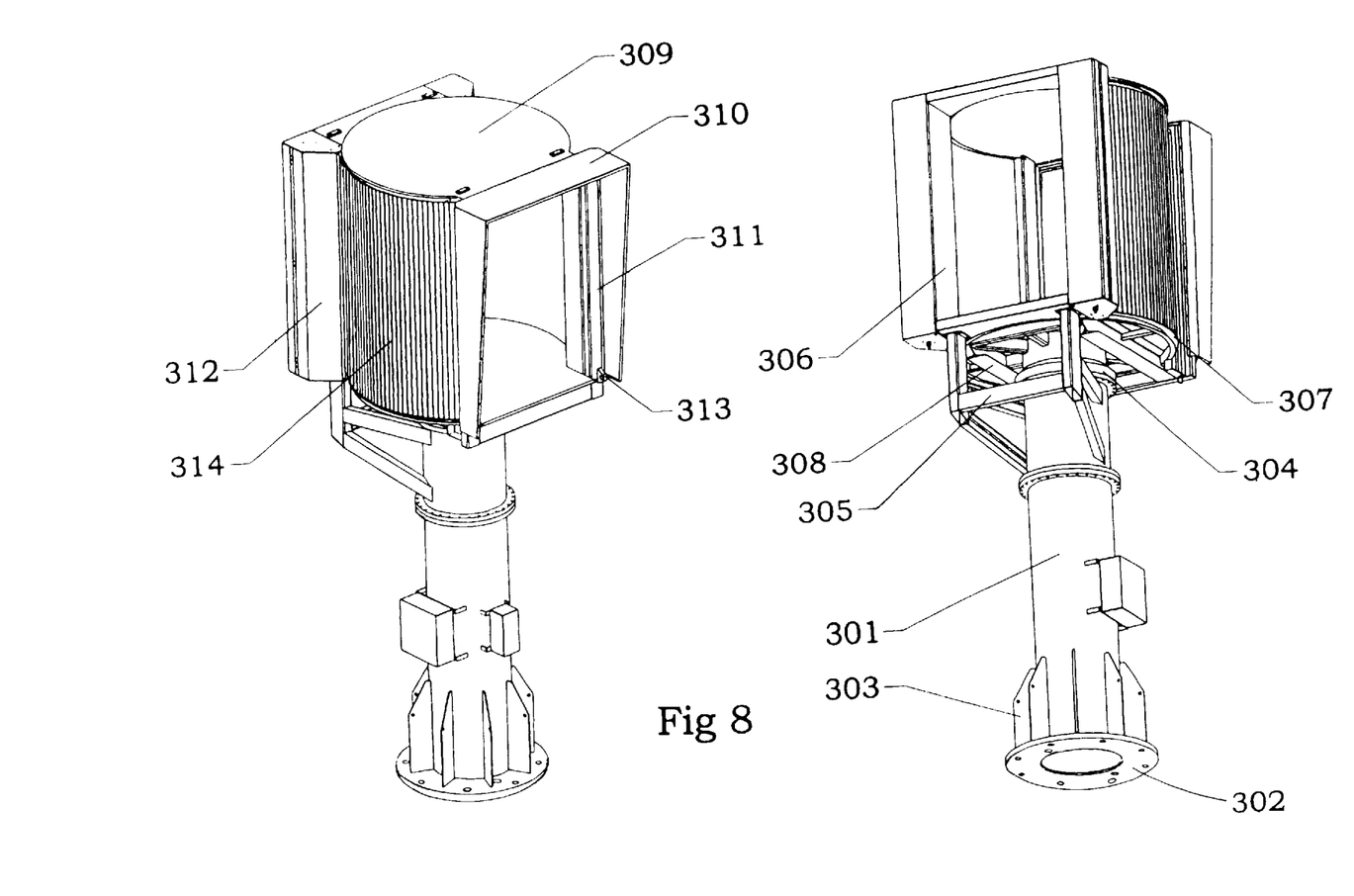
FIG. 8 is a perspective view of passenger boarding bridge for narrow body aircraft according to the above preferred embodiment of the present invention, illustrating the structure of the rotunda.

Above the round flange 302 at the bottom of the large supporting column 301 of the rotunda III are welded eight ribs 303 for reinforcement. On the top of the large supporting column 301 there is a large swivel bearing 304. Below this bearing a supporting frame 305 is welded to the column to support a fixed frame 306. The shape of the he fixed frame 306 is similar to that of the air terminal boarding gate, to which it connects. The large swivel bearing 304 directly supports the horizontal rotating frame 307 which is integrated with its base plate 308. The roof 309 and base 308 plates of the rotating frame are positioned horizontally at the top and bottom, respectively. On the two sides of the other end of the roof 309 is mounted the tunnel entrance connection 311. A roller blinds structure 312 is installed on the two sides of the fixed frame. The bottom of the tunnel entrance connection 311 has a pin shaft hole 313, by which the pin shaft joins the rotunda III with Tunnel A. Between tunnel A and the rotunda III there is a cover 310 for protection against wind, rain and snow.

Figure 9:
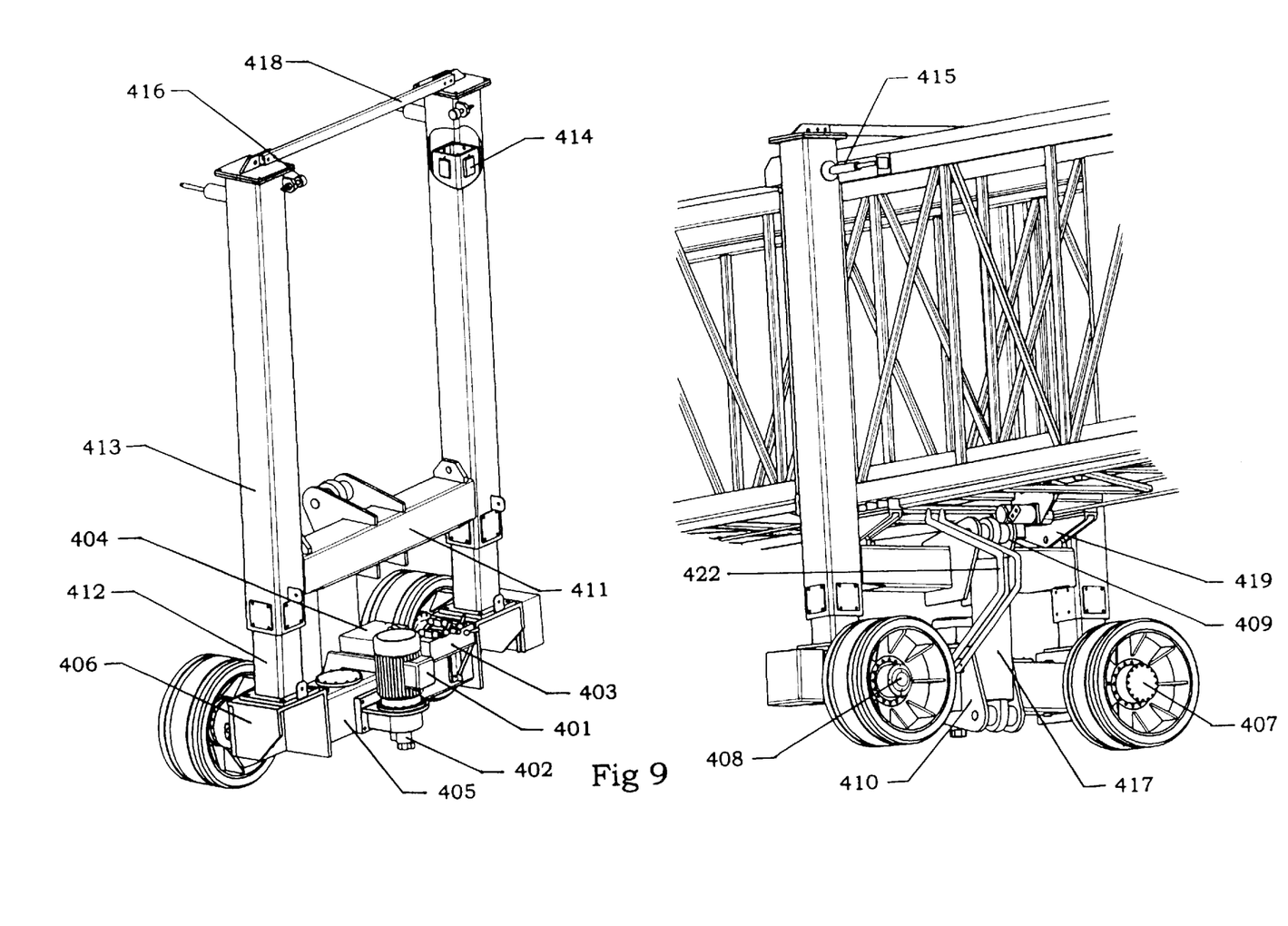
FIG. 9 is a the perspective view of passenger boarding bridge for narrow body aircraft according to the above preferred embodiment of the present invention, illustrating the structure of the elevating columns with wheel carriage.

Elevating columns with wheel carriage IV: The wheel carriage assembly 406 includes a driving wheel bogie and slave wheel bogie which support the entire elevating columns with wheel carriage IV and are fitted with the driving wheel 407 and slave wheel 408, respectively. The oil tank 405 connects the two wheels. The driving wheel is driven by a motor 420 which is mounted on the bogie. The angle between the planes of the driving wheel and slave wheel is 174° so that the wheels can rotate around the center of the rotunda along a circular curve of radius 22705 mm. Within a 180° arc of rotation the system can rock sideways. An electric motor 401, oil pump 402, valve station 403, electricity box 404 and oil pipes are installed on the oil tank 405. Rising vertically from the two bogies are the elevating columns each of which includes an inner column 412 and an outer column 413. The inner columns 412 are bolted to the wheel carriage assembly 406, while base of the two outer columns 413 are connected by the horizontal cross beam. Nylon slider pads 414 are inserted between the inner and outer columns. Tunnel B is connected to the horizontal cross beam 411 by pin shaft fixtures 419, and rotates about the shaft 419 when it is raised or lowered. The elevating cylinder 417 is connected by its upper mount 409 to the horizontal cross beam 411. The lower cylinder mount 410 is connected to the oil tank. Tunnel B is connected to the oil tank by jointed connecting rods 422. When the elevating columns with wheel carriage IV are in operation rising or descending, there will be some longitudinal movement between the elevating columns and Tunnel B, so in this invention a spring or cylinder assembly 415 is installed at the top of Tunnel B on both sides of the columns to maintain balance. To prevent lateral rocking of the elevating columns with wheel carriage when rotating, this invention has also installed sliding pads 416 between the columns and tunnel to keep the tunnel in place.

What is claimed is:

1. A passenger boarding bridge for narrow body aircraft, comprising:

a rotunda;

a telescopic tunnel, which includes an outer tunnel and an inner telescoping tunnel and an outer tunnel capable of extending into and out of said outer tunnel, having a first end connected to said rotunda; and a cab, which is connected to a second end of said telescopic tunnel, having two openings provided on a right hand half of a floor of said cab lengthwise so as to divide said floor into a first floor and a second floor, wherein said cab further includes:

two up-foldable hinged floor boards connected to said floor at said two openings respectively, gas springs provided on a back side of said first floor to flip up said hinged floor boards, a first cylinder moving an extension board forward and backward at a front end of said first floor, electrical locks provided on a right hand side of said second floor and at a bottom of an inner side of a right hand floor opening for locking said hinged floor boards when said hinged floor boards are in a horizontal position, a second cylinder provided on a back side of said second floor for pushing sideways a bumper at a front end of said second floor, a canopy being provided on said cab, a first piece of a frame of said canopy having two short plates, a bottom part of said frame being split but connecting with a hinge, a front part of said frame being covered with foam rubber, a top of said frame having attached a gas spring to open up said frame and allow it to assume a multisided shape, wherein a steel cable and pulley assembly used to close up said canopy is fixed on two sides of said cab and an actuator is affixed at a top of said cab, a small handrail, which is provided at a right of said cab above said respective hinged floor board, being affixed to said frame, wherein above said small handrail, a control panel is mounted on a shaft on said frame in such manner that said control panel is able to rotate around said shaft, and that a wire glass is installed on each of said two sides of said cab, a rotating frame to which said cab being connected through a roller system provided on a base of said cab and nylon sliding pads provided on an upper part of rear sides of said cab, wherein a cylinder is mounted on a base beam for driving said cab to move sideways in a transverse direction on said rotating frame, wherein said rotating frame is connected to said telescopic tunnel by means of two large pin shafts on a left frame of said telescopic tunnel and two sliding pads at a top and bottom of a right frame of said telescopic tunnel, said rotating frame being driven by a cylinder provided at a base thereof to rotate around said pin shaft from 80° left to 15° right, wherein a fan-shaped roof provided on top of said rotating frame and a fan-shaped floor platform provided at a bottom are both made of rolled channel steel, so that, during rotation, said channel steel slides along said sliding pads, pleated screens being provided between said rotating frame and said cab as well as on both side walls of said cab, and folding screen walls provided between said rotating frame and telescopic tunnel being made of glass panels.

2. A passenger boarding bridge for narrow body aircraft according to claim 1 wherein said telescopic tunnel includes a first tunnel, a second tunnel and a third tunnel, said first tunnel is an extension section and is connected to said rotunda at one end and affixed at the other end to said second tunnel with bolts, said third tunnel being connected to said cab and arranged capable of sliding along a length thereof inside said second tunnel along sliding pads which are mounted at four corners of said second tunnel, wherein a motor mounted at a bottom of said second tunnel drives said third tunnel so as to extend and retract when pulling by a chain installed at a bottom thereof.

3. A passenger boarding bridge for narrow body aircraft according to claim 2 wherein all four sides of said telescopic tunnel are of truss structure and two sides are fitted with laminated glass, wherein said telescopic tunnel further comprises an N-shaped duct on a bottom part of said truss structure of said telescopic tunnel for housing electric cables and oil pipes between said second and third tunnels, a braking device provided at a cab end of said second tunnel so that in case said chain breaks and said third tunnel starts to slide forward, said third tunnel is stopped inside said second tunnel, a ramp installed between said third tunnel and said cab, a baggage provided at one side of an interconnection between said second tunnel and said first tunnel, a service staircase, a baggage conveyor belt provided alongside said service staircase for transporting baggage, and a case for holding electrical components mounted opposite said baggage door.

4. A passenger boarding bridge for narrow body aircraft according to claim 3 further comprising:

a supporting column for supporting said rotunda, a swivel bearing provided at a top of said supporting column, a truss which is positioned below said swivel bearing and welded to said column, a fixed frame which is supported by said truss welded to said column, wherein a shape of said fixed frame is similar to that of an air terminal boarding gate to which said fixed frame to be connected, a horizontal rotating frame, which forms a single structure with a base plate, directly supported by said swivel bearing, roof and base plates being positioned horizontally on a top and bottom of a tunnel connection structure, one end of said rotating frame being connected to said fixed frame which has a rear end having a means on two sides for joining to said tunnel connection structure and roller blinds structure installed on the other two sides, wherein said tunnel connection structure and a top of said roller blinds structure are both separatedly joined to said roof plate of said rotating frame, a bottom of a tunnel entrance connection having a pin shaft hole, through which a pin shaft connects said rotunda with said telescopic tunnel, and a cover is provided between said first tunnel and said rotunda for sealing and protection against wind, rain and snow.

5. A passenger boarding bridge for narrow body aircraft according to claim 4 further comprising a wheel carriage assembly which includes at least an elevating column with wheel carriage which includes a driving wheel bogie and a slave wheel bogie which support said elevating column and are fitted with a driving wheel and a slave wheel respectively, an oil tank connecting said two wheels, wherein said driving wheel is driven by a motor which is mounted on said wheel carriage assembly, an angle between planes of said driving wheel and slave wheel is 174° so that said driving wheel and slave wheels are capable of rotating around a center of said rotunda along a circular so that a 180° arc of rotation, said passenger boarding bridge is able to rock sideways, wherein said an oil tank has an electric motor, an oil pump, a valve station, an electricity box and oil pipes installed thereon, two elevating columns rise vertically from said two wheel bogies, wherein each of said elevating columns includes an inner column bolted to said wheel carriage assembly, an outer column which bases thereof joined by a horizontal cross beam, and nylon slider pads being inserted between said inner and outer column, wherein said second tunnel is connected to said horizontal cross beam by pin shaft fixtures and rotates about a shaft during raising and lowering said second tunnel, an elevating cylinder connected by an upper mount thereof to a horizontal cross beam, a lower cylinder mount of said elevating cylinder being connected to said oil tank, said second tunnel being connected to said oil tank by jointed connecting rods, a balance assembly being installed at a top of said second tunnel on both sides of said columns to maintain balance and prevent longitudinal movement between said elevating columns and said second tunnel, sliding pads being installed between said elevating columns and said telescopic tunnel to keep said telescopic tunnel in place.

6. A passenger boarding bridge for narrow body aircraft according to claim 3 further comprising a wheel carriage assembly which includes at least an elevating column with wheel carriage which includes a driving wheel bogie and a slave wheel bogie which support said elevating column and are fitted with a driving wheel and a slave wheel respectively, an oil tank connecting said two wheels, wherein said driving wheel is driven by a motor which is mounted on said wheel carriage assembly, an angle between planes of said driving wheel and slave wheel is 174° so that said driving wheel and slave wheels are capable of rotating around a center of said rotunda along a circular so that a 180° arc of rotation, said passenger boarding bridge is able to rock sideways, wherein said an oil tank has an electric motor, an oil pump, a valve station, an electricity box and oil pipes installed thereon, two elevating columns rise vertically from said two wheel bogies, wherein each of said elevating columns includes an inner column bolted to said wheel carriage assembly, an outer column which bases thereof joined by a horizontal cross beam, and nylon slider pads being inserted between said inner and outer column, wherein said second tunnel is connected to said horizontal cross beam by pin shaft fixtures and rotates about a shaft during raising and lowering said second tunnel, an elevating cylinder connected by an upper mount thereof to a horizontal cross beam, a lower cylinder mount of said elevating cylinder being connected to said oil tank, said second tunnel being connected to said oil tank by jointed connecting rods, a balance assembly being installed at a top of said second tunnel on both sides of said columns to maintain balance and prevent longitudinal movement between said elevating columns and said second tunnel, sliding pads being installed between said elevating columns and said telescopic tunnel to keep said telescopic tunnel in place.

7. A passenger boarding bridge for narrow body aircraft according to claim 2 further comprising:
   a supporting column for supporting said rotunda,
   a swivel bearing provided at a top of said supporting column,
   a truss which is positioned below said swivel bearing and welded to said column,
   a fixed frame which is supported by said truss welded to said column, wherein a shape of said fixed frame is similar to that of an air terminal boarding gate to which said fixed frame to be connected,
   a horizontal rotating frame, which forms a single structure with a base plate, directly supported by said swivel bearing,
   roof and base plates being positioned horizontally on a top and bottom of a tunnel connection structure, one end of said rotating frame being connected to said fixed frame which has a rear end having a means on two sides for joining to said tunnel connection structure and roller blinds structure installed on the other two sides, wherein said tunnel connection structure and a top of said roller blinds structure are both separatedly joined to said roof plate of said rotating frame, a bottom of a tunnel entrance connection having a pin shaft hole, through which a pin shaft connects said rotunda with said telescopic tunnel, and
   a cover is provided between said first tunnel and said rotunda for sealing and protection against wind, rain and snow.

8. A passenger boarding bridge for narrow body aircraft according to claim 7 further comprising a wheel carriage assembly which includes at least an elevating column with wheel carriage which includes a driving wheel bogie and a slave wheel bogie which support said elevating column and are fitted with a driving wheel and a slave wheel respectively, an oil tank connecting said two wheels, wherein said driving wheel is driven by a motor which is mounted on said wheel carriage assembly, an angle between planes of said driving wheel and slave wheel is 174° so that said driving wheel and slave wheels are capable of rotating around a center of said rotunda along a circular so that a 180° arc of rotation, said passenger boarding bridge is able to rock sideways, wherein said an oil tank has an electric motor, an oil pump, a valve station, an electricity box and oil pipes installed thereon, two elevating columns rise vertically from said two wheel bogies, wherein each of said elevating columns includes an inner column bolted to said wheel carriage assembly, an outer column which bases thereof joined by a horizontal cross beam, and nylon slider pads being inserted between said inner and outer column, wherein said second tunnel is connected to said horizontal cross beam by pin shaft fixtures and rotates about a shaft during raising and lowering said second tunnel, an elevating cylinder connected by an upper mount thereof to a horizontal cross beam, a lower cylinder mount of said elevating cylinder being connected to said oil tank, said second tunnel being connected to said oil tank by jointed connecting rods, a balance assembly being installed at a top of said second tunnel on both sides of said columns to maintain balance and prevent longitudinal movement between said elevating columns and said second tunnel, sliding pads being installed between said elevating columns and said telescopic tunnel to keep said telescopic tunnel in place.

9. A passenger boarding bridge for narrow body aircraft according to claim 2 further comprising a wheel carriage assembly which includes at least an elevating column with wheel carriage which includes a driving wheel bogie and a slave wheel bogie which support said elevating column and are fitted with a driving wheel and a slave wheel respectively, an oil tank connecting said two wheels, wherein said driving wheel is driven by a motor which is mounted on said wheel carriage assembly, an angle between planes of said driving wheel and slave wheel is 174° so that said driving wheel and slave wheels are capable of rotating around a center of said rotunda along a circular so that a 180° arc of rotation, said passenger boarding bridge is able to rock sideways, wherein said an oil tank has an electric motor, an oil pump, a valve station, an electricity box and oil pipes installed thereon, two elevating columns rise vertically from said two wheel bogies, wherein each of said elevating columns includes an inner column bolted to said wheel carriage assembly, an outer column which bases thereof joined by a horizontal cross beam, and nylon slider pads being inserted between said inner and outer column, wherein said second tunnel is connected to said horizontal cross beam by pin shaft fixtures and rotates about a shaft during raising and lowering said second tunnel, an elevating cylinder connected by an upper mount thereof to a horizontal cross beam, a lower cylinder mount of said elevating cylinder being connected to said oil tank, said second tunnel being connected to said oil tank by jointed connecting rods, a balance assembly being installed at a top of said second tunnel on both sides of said columns to maintain balance and prevent longitudinal movement between said elevating columns and said second tunnel, sliding pads being installed between said elevating columns and said telescopic tunnel to keep said telescopic tunnel in place.

10. A passenger boarding bridge for narrow body aircraft according to claim 1 further comprising:

a supporting column for supporting said rotunda, a swivel bearing provided at a top of said supporting column, a truss which is positioned below said swivel bearing and welded to said column, a fixed frame which is supported by said truss welded to said column, wherein a shape of said fixed frame is similar to that of an air terminal boarding gate to which said fixed frame to be connected, a horizontal rotating frame, which forms a single structure with a base plate, directly supported by said swivel bearing, roof and base plates being positioned horizontally on a top and bottom of a tunnel connection structure, one end of said rotating frame being connected to said fixed frame which has a rear end having a means on two sides for joining to said tunnel connection structure and roller blinds structure installed on the other two sides, wherein said tunnel connection structure and a top of said roller blinds structure are both separatedly joined to said roof plate of said rotating frame, a bottom of a tunnel entrance connection having a pin shaft hole, through which a pin shaft connects said rotunda with said telescopic tunnel, and a cover is provided between said first tunnel and said rotunda for sealing and protection against wind, rain and snow.

* * * * *